(12) United States Patent
Kim et al.

(10) Patent No.: US 9,568,775 B2
(45) Date of Patent: Feb. 14, 2017

(54) DISPLAY DEVICE AND METHOD OF MANUFACTURING THE SAME

(71) Applicant: Samsung Display Co., Ltd., Yongin, Gyeonggi-Do (KR)

(72) Inventors: Dong Gyu Kim, Yongin (KR); Do Hoon Kim, Yongin (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 316 days.

(21) Appl. No.: 13/834,895

(22) Filed: Mar. 15, 2013

(65) Prior Publication Data
US 2014/0022478 A1    Jan. 23, 2014

(30) Foreign Application Priority Data
Jul. 23, 2012   (KR) .................. 10-2012-0080004

(51) Int. Cl.
*G02F 1/1339*   (2006.01)
*G02F 1/1362*   (2006.01)
*G02F 1/1335*   (2006.01)

(52) U.S. Cl.
CPC .......... *G02F 1/1339* (2013.01); *G02F 1/13394* (2013.01); *G02F 1/136286* (2013.01); *G02F 1/133512* (2013.01); *G02F 2201/121* (2013.01)

(58) Field of Classification Search
CPC ............ G02F 1/133514; G02F 1/13394; G02F 1/1339; G02F 1/136227; G02F 2001/133388; G02F 2201/40; G02F 2201/52; G02F 2001/136231; G02F 2001/13398; G02F 1/136286; G02F 1/133286; G02F 1/133512; G02F 1/134336; G02F 1/1343; G02F 2001/13396; G02F 2001/13629; G02F 2001/134318; G02F 2201/42; G02F 2201/121; G02F 1/133345; G02F 1/133357; G02F 1/133711; G02F 1/133723; G02F 1/3615; G02F 2201/44; G02F 2202/02; G02F 2202/022; G02F 2202/023; G02F 2202/025

(Continued)

(56) References Cited

U.S. PATENT DOCUMENTS 5,748,266 A * 5/1998 Kodate ............ G02F 1/136213
                                                349/106
6,392,735 B1 * 5/2002 Tani .................. G02F 1/13394
                                                349/153

(Continued)

*Primary Examiner* — Paisley L Arendt
*Assistant Examiner* — Angela Davison
(74) *Attorney, Agent, or Firm* — Knobbe Martens Olson & Bear LLP

(57) ABSTRACT

A display device includes a first substrate and a second substrate opposing each other. One of the first and second substrates includes a display surface. The display device further includes a display area and a non-display area surrounding the display area when viewed in a direction perpendicular to the display device. The display device includes a common voltage line formed in the non-display area and over the first substrate, at least one column spacer formed over the common voltage line, a conductive layer formed over the first substrate to cover the column spacer and electrically connected to the common voltage line, a common electrode formed over the second substrate and electrically connected to the conductive layer, and a liquid crystal layer interposed between the first substrate and the second substrate.

9 Claims, 9 Drawing Sheets

(58) Field of Classification Search
USPC .......................... 349/106, 139, 141, 147, 153, 155–157,349/138
See application file for complete search history.

(56) References Cited

U.S. PATENT DOCUMENTS

| | | | |
|---|---|---|---|
| 7,068,339 B2* | 6/2006 | Nakamura | G02F 1/1339 349/152 |
| 7,212,263 B2* | 5/2007 | Jeoung et al. | 349/110 |
| 7,453,541 B2* | 11/2008 | Yanagawa | G02F 1/1303 349/139 |
| 7,535,540 B2* | 5/2009 | SangChul | G02F 1/133345 349/155 |
| 7,872,724 B2* | 1/2011 | Yoon | G02F 1/13306 349/156 |
| 2005/0195353 A1* | 9/2005 | Park | G02F 1/133555 349/139 |
| 2007/0058125 A1* | 3/2007 | Yoo et al. | 349/152 |
| 2012/0120361 A1* | 5/2012 | Yanagawa | G02F 1/1333 349/139 |

* cited by examiner

100 ically as used in the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

DISPLAY DEVICE AND METHOD OF MANUFACTURING THE SAME

CROSS-REFERENCE TO RELATED APPLICATION

This application claims priority from Korean Patent Application No. 10-2012-0080004 filed on Jul. 23, 2012 in the Korean Intellectual Property Office, the disclosure of which is incorporated herein by reference in its entirety.

BACKGROUND

1. Field

The present disclosure relates to a display device and a method of manufacturing the same.

2. Discussion of the Related Technology

Display device, in particular, liquid crystal display devices, are used in a wide variety of applications, including small-sized products, such as a cellular phone, a personal digital assistant (PDA) or a portable multimedia player (PMP), or middle- and large-sized products, such as a monitor, TV or the like.

The display device includes a display area in which an image is displayed, and a non-display area in which wirings, a black matrix (BM) and so on are formed. The desire for slim, lightweight display devices may require reducing the width of black matrix. However, spaces are required for a common voltage line, gate lines, short-circuit points, etc., which are formed in the non-display area. This may limit the reduction of the width of the black matrix.

SUMMARY

One aspect of the present invention provides a display device and a method of manufacturing the same, which can employ a slim black matrix having a reduced width in a non-display area.

Another aspect of the present invention also provides a display device and a method of manufacturing the same, which can implement a simplified process by eliminating a separate process performed on a short-circuit point between a common voltage line and a common electrode of a color filter substrate.

The above and other features and advantages of the present invention will be described in or be apparent from the following description of the embodiments.

According to an aspect of the present invention, a display device includes a first substrate and a second substrate opposing each other, one of the first and second substrates comprising a display surface, a display area and a non-display area surrounding the display area when viewed in a direction perpendicular to the display surface, a common voltage line formed in the non-display area and over the first substrate, at least one column spacer formed over the common voltage line, a conductive layer formed over the first substrate to cover the column spacer and electrically connected to the common voltage line, a common electrode formed over the second substrate and electrically connected to the conductive layer, and a liquid crystal layer interposed between the first substrate and the second substrate.

According to another aspect of the present invention, a display device includes a first substrate and a second substrate opposing each other, one of the first and second substrates comprising a display surface, a display area and a non-display area surrounding the display area when viewed in a direction perpendicular to the display surface, a common voltage line formed in the non-display area and over the first substrate, a conductive layer formed over the common voltage line and electrically connected to the common voltage line, at least one column spacer formed over the second substrate, a common electrode formed over the second substrate to cover the column spacer and electrically connected to the conductive layer, and a liquid crystal layer interposed between the first substrate and the second substrate.

According to still another aspect of the present invention, a method of manufacturing a display device is provided. The method includes forming a black matrix and a color filter over a substrate, forming a coating layer over the black matrix and the color filter, forming a first column spacer and a second column spacer over the coating layer, and forming a common electrode over the coating layer and the first column spacer.

As described above, according to the display device of an aspect of the present invention and the method of manufacturing the same, a slim black matrix BM having a reduced width can be provided in a non-display area of the display device, that is, a reduced width of a black matrix can be employed.

According to the display device of another aspect of the present invention and the method of manufacturing the same, a simplified process can be implemented by eliminating multiple steps for forming a short-circuit point between a common voltage line and a common electrode of a color filter substrate.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS

Embodiments of the present invention will now be described more fully hereinafter with reference to the accompanying drawings, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The use of the terms "a," "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Hereinafter, embodiments of the present invention will be described in further detail with reference to the accompanying drawings.

Figure 1:
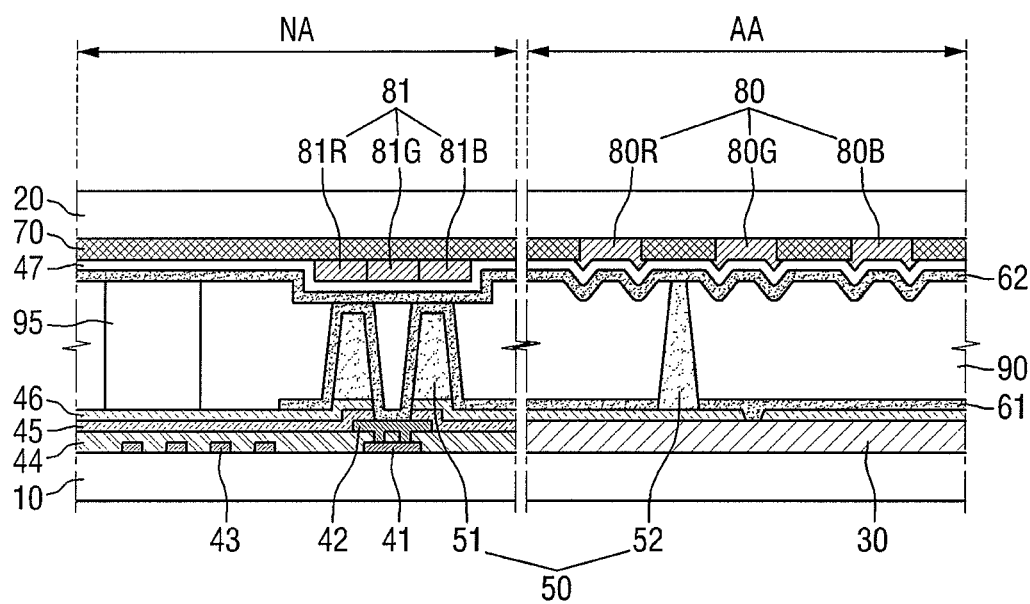
FIGS. 1 to 6 are cross-sectional views of a display device according to various embodiments of the present invention.

FIG. 1 is a cross-sectional view of a display device according to an embodiment of the present invention. Referring to FIG. 1, the display device 100 is a TN mode liquid crystal display device and includes a first substrate 10, a second substrate 20, a common voltage line 41, a plurality of column spacers 50, a conductive layer 61, a common electrode 62 and a liquid crystal layer 90. In embodiments, the second substrate may include a display surface. For the sake of convenient explanation, FIG. 1 illustrates only a partial section of the display device 100.

The first substrate 10 and the second substrate 20 are substrates opposing each other in the display device 100, and may be made of an insulating material, for example, glass or a plastic material.

The first substrate 10 and the second substrate 20 are disposed to face each other, and the liquid crystal layer 90 is interposed between the first substrate 10 and the second substrate 20. In addition, a sealant 95 may be disposed at an outer periphery of the liquid crystal layer 90, that is, at outer peripheral areas of the first substrate 10 and the second substrate 20. The sealant 95 is provided for protecting internal elements by sealing the first substrate 10 and the second substrate 20, and may be made of various materials, such as a thermo-curable material or a photo-curable material.

In embodiments, the display device may include a display area AA and a non-display area NA when viewed in a viewing direction perpendicular to the display surface. In an embodiment, the non-display area NA surrounds the display area AA when viewed in the viewing direction. Each of the first substrate 10 and the second substrate 20 includes an area corresponding to the display area AA and the non-display area NA when viewed in the viewing direction. The display area AA is an area of the display device 100, on which an image is displayed, and the non-display area NA is an area other than the display area AA of the display device 100. A variety of wirings and the sealant 95 may be disposed on or over the non-display area NA. The display area AA of the first substrate 10 and the display area AA of the second substrate 20 may oppose each other. In addition, the non-display area NA of the first substrate 10 and the non-display area NA of the second substrate 20 may correspond to each other.

In embodiments, at least one thin film transistor or a plurality of thin film transistors 30 may be formed on the first substrate 10. Specifically, the at least one thin film transistor 30 may be formed on the display area AA of the first substrate 10. For the sake of convenient explanation, while FIG. 1 illustrates the thin film transistor 30 as an element, the thin film transistor 30 may include a gate electrode, a semiconductor layer, a source electrode and a drain electrode. However, a configuration of the thin film transistor 30 is not limited to the illustrated example and may be modified in various manners using well-known configurations which can be easily embodied by one skilled in the art. In this way, if the thin film transistor 30 for driving the display device 100 is formed on the first substrate 10, the first substrate 10 may also be referred to a thin film transistor substrate.

Various wirings may be formed on the non-display area NA of the first substrate 10. Referring to FIG. 1, in embodiments, the common voltage line 41 and the gate line 43 are formed on the non-display area NA of the first substrate 10. The common voltage line 41 is a wiring for applying a common voltage to the common electrode 62, and the gate line 43 is a wiring for applying a gate signal to the gate electrode of the thin film transistor 30. Although not shown in FIG. 1, the common voltage line 41 and the gate line 43 may be connected to the display area AA and may transmit signals thereto.

An insulation film 44 may be formed on the first substrate 10 to cover a variety of wirings, such as the common voltage line 41 and the gate line 43. The insulation film 44 may be formed on both of the display area AA and the non-display area NA of the first substrate 10 and may open a portion of the common voltage line 41. In some embodiments of the present invention, the insulation film 44 may be a gate insulation film.

In embodiments, an intermediate conductor 42 formed on the common voltage line 41 and electrically connected to the common voltage line 41 may be formed on the first substrate 10. The intermediate conductor 42 may be formed on the insulation film 44 and may be electrically connected to the intermediate conductor 42 through an opening of the insulation film 44. In some embodiments of the present invention, the intermediate conductor 42 may be formed of substantially the same material as the source electrode and the drain electrode of the thin film transistor 30 and may be formed substantially at the same time as the source electrode and the drain electrode of the thin film transistor 30.

A passivation film 45 may be formed on the first substrate 10 to cover the intermediate conductor 42. The passivation film 45 may be formed on both of the display area AA and the non-display area NA of the first substrate 10 and may open a portion of the intermediate conductor 42.

An organic film 46 for protecting the thin film transistor 30 and increasing an aperture ratio may be formed on the first substrate 10. The organic film 46 may be formed on both of the display area AA and the non-display area NA of the first substrate 10 and may open a portion of the intermediate conductor 42 or a portion of the thin film transistor 30.

In embodiments, a plurality of column spacers 50 may be formed on the first substrate 10 to maintain a cell gap between the first substrate 10 and the second substrate 20. The plurality of column spacers 50 may include a first column spacer 51 formed in the non-display area NA of the first substrate 10 and a second column spacer 52 formed in the display area AA. The first column spacer 51 may be formed on the common voltage line 41 in the non-display area NA, and the second column spacer 52 may be formed on the organic film 46 in the display area AA. The first column spacer 51 formed in the non-display area NA may be disposed to be closer to the display area AA than the sealant 95 formed in the non-display area NA. For brevity, FIG. 1 illustrates two of the first column spacer 51 and one of the second column spacer 52, but aspects of the present invention are not limited thereto. Various numbers of the first and second column spacers may be provided, respectively. In embodiments, the column spacer 51 may extend from a structure formed over the first substrate such that a layer, for example, the conductive layer 61, formed over the column spacer 51 can contact a layer, for example, the common electrode 62, formed over the second substrate.

In embodiments, the conductive layer 61 is formed on the first substrate 10 to cover the first column spacer 51 formed in the non-display area NA. The conductive layer 61 covers the first column spacer 51 formed in the non-display area NA to be formed along the surface of the first column spacer 51 and in conformity with the surface of the first column spacer 51. The conductive layer 61 may be formed of a transparent conductive material, for example, indium tin oxide (ITO), indium zinc oxide (IZO) or the like. The conductive layer 61 may be formed in the display area AA of the first substrate 10. The conductive layer 61 formed in the display area AA of the first substrate 10 may function as a pixel electrode. Therefore, the conductive layer 61 formed in the display area AA of the first substrate 10 may be electrically connected to the drain electrode of the thin film transistor 30 through the opening or via-hole of the organic film 46. In addition, the conductive layer 61 may be formed in the non-display area NA of the first substrate 10. The conductive layer 61 formed in the non-display area NA of the first substrate 10 may be electrically connected to the common voltage line 41 through the passivation film and the opening of the organic film 46. Specifically, the conductive layer 61 formed in the non-display area NA of the first substrate 10 may be electrically connected to the common voltage line 41 through the intermediate conductor 42. The conductive layer 61 electrically connected to the common voltage line 41 may apply the common voltage to the common electrode 62 formed on the second substrate 20, which will later be described.

A black matrix 70 may be formed on the second substrate 20 in a predetermined pattern. The black matrix 70 may be formed on both of the display area AA and the non-display area NA of the second substrate 20, thereby suppressing components that are not necessary to be viewed from being viewed while preventing color mixing and interference of visible light rays implemented through the color filter 80. The predetermined pattern of the black matrix 70 includes openings. The color filter 80 may include a red color filter 80, a green color filter 80 and a blue color filter 80 and may be formed to fill the openings of the black matrix 70. A portion of the color filter 80 may be formed on the black matrix 70 in the course of filling the black matrix 70. While FIG. 1 illustrates the embodiment in which the portion of the color filter 80 is formed on the black matrix 70, it is obvious that the color filter 80 may fill the openings of the black matrix 70 so as to be removed from the black matrix 70. A dummy color filter 81 may be formed in the non-display area NA of the second substrate 20. Alternatively, the dummy color filter 81 may be formed on the black matrix 70 in the non-display area NA. As described above, when the color filter 80 is formed on the second substrate 20, the second substrate 20 may also be referred to as a color filter substrate.

A coating layer 47 may be formed on the second substrate 20 to cover the black matrix 70, the color filter 80 and the dummy color filter 81. The coating layer 47 may be formed on both of the display area AA and the non-display area NA of the second substrate 20.

The common electrode 62 may be formed on the second substrate 20. The common electrode 62 may be formed on both of the display area AA and the non-display area NA of the second substrate 20. Alternatively, the common electrode 62 may be formed on the black matrix 70, the color filter 80 and the dummy color filter 81. In addition, the common electrode 62 may also be formed on the coating layer 47. The common electrode 62 may be formed of a transparent conductive material, for example, indium tin oxide (ITO), indium zinc oxide (IZO) or the like.

The common electrode 62 formed on the second substrate 20 and the conductive layer 61 formed on the first substrate 10 may be electrically connected to each other. Therefore, the common voltage applied to the common voltage line 41 may also be applied to the common electrode 62. Specifically, the common voltage applied to the common voltage line 41 may also be applied to the common electrode 62 through the intermediate conductor 42 and the conductive layer 61.

In the display device according to the embodiment of the present invention, a short-circuit point for short-circuiting a common voltage line and a common electrode is not necessary. That is to say, in order to electrically connect a common voltage line formed on a thin film transistor substrate and a common electrode formed on a color filter substrate to each other, a separate short-circuit point has conventionally been formed in a non-display area. Thus, a width of the non-display area has increased and a width of a black matrix has increased accordingly. However, in the display device according to the embodiment of the present invention, a column spacer may function as a short-circuit point without manufacturing a short-circuit point, thereby implementing a simplified process.

In addition, in the display device according to the embodiment of the present invention, it is not necessary to secure a separate area for forming a short-circuit point on a non-display area, and a slim black matrix having a reduced width can be employed.

Figure 2:
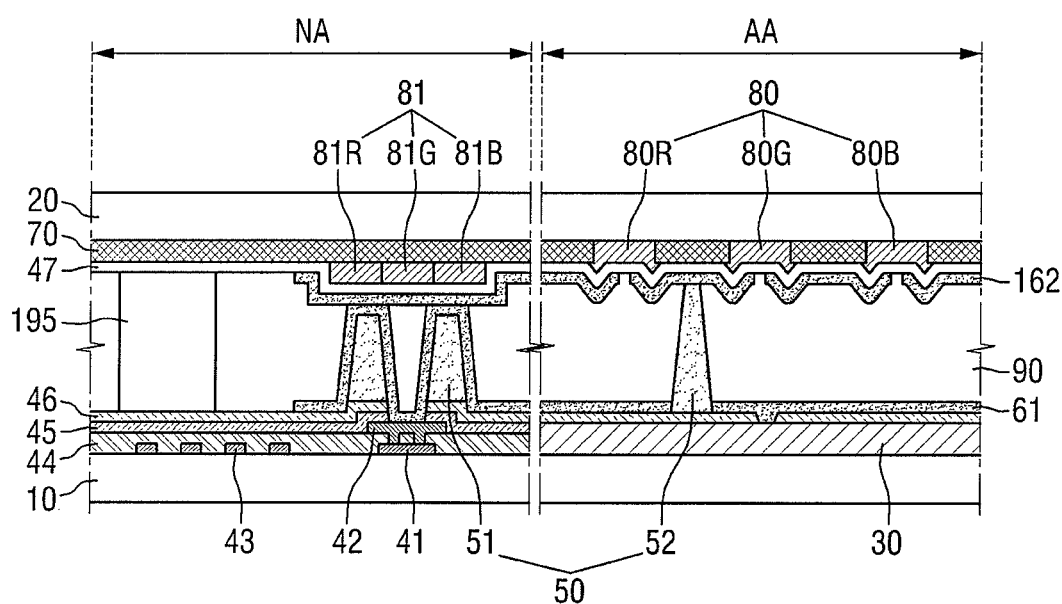

FIG. 2 is a cross-sectional view of a display device according to another embodiment of the present invention. Referring to FIG. 2, the display device 200 is a VA mode liquid crystal display device and includes a first substrate 10, a second substrate 20, a common voltage line 41, a plurality of column spacers 50, a conductive layer 61, a common electrode 162 and a liquid crystal layer 90. FIG. 2 shows only a partial section of the display device 200. For the sake of convenient explanation, in FIG. 2, substantially the same elements as those of the display device shown in FIG. 1 are denoted by the same reference numerals and repeated explanations will be omitted.

The common electrode 162 may be formed on the second substrate 20. The common electrode 162 may be formed on both of the display area AA and the non-display area NA of the second substrate 20. Alternatively, the common electrode 162 may be formed on the black matrix 70, the color filter 80 and the dummy color filter 81. In addition, the common electrode 162 may also be formed on the coating layer 47. The common electrode 162 may include the cutout portion that opens or exposes a portion of the color filter 80 and does not overlap a sealant 195 when viewed in the viewing direction. The common electrode 162 and the sealant 195 are substantially the same as the common electrode 62 and the sealant 95 shown in FIG. 1, except that the common electrode 162 includes a cutout portion and does not overlap the sealant 195 when viewed in the viewing direction, and repeated explanations thereof will be omitted.

Figure 3:
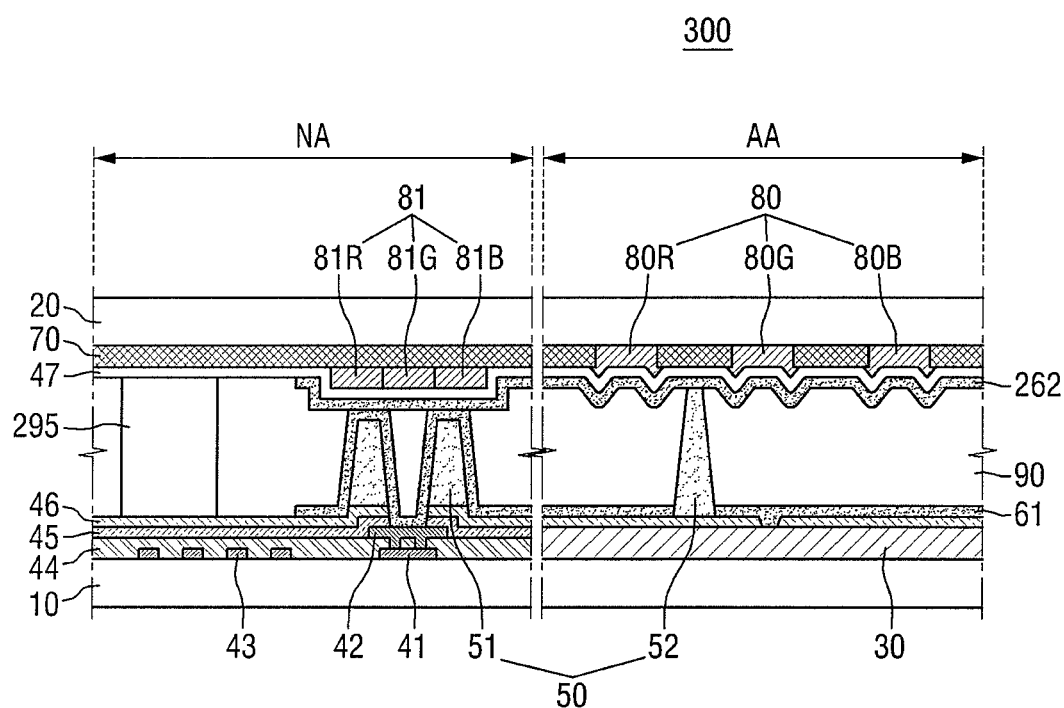

FIG. 3 is a cross-sectional view of a display device according to still anther embodiment of the present invention. Referring to FIG. 3, the display device 300 is a TN mode liquid crystal display device having an improved delaminating property and includes a first substrate 10, a second substrate 20, a common voltage line 41, a plurality of column spacers 50, a conductive layer 61, a common electrode 262 and a liquid crystal layer 90. FIG. 3 shows only a partial section of the display device 300. For the sake of convenient explanation, in FIG. 3, substantially the same elements as those of the display device shown in FIG. 1 are denoted by the same reference numerals and repeated explanations will be omitted.

The common electrode 262 may be formed on the second substrate 20. The common electrode 262 may be formed on both of the display area AA and the non-display area NA of the second substrate 20. Alternatively, the common electrode 262 may be formed on the black matrix 70, the color filter 80 and the dummy color filter 81. In addition, the common electrode 262 may also be formed on the coating layer 47. The common electrode 262 and a sealant 295 do not overlap each other when viewed in the viewing direction. The common electrode 262 and the sealant 295 are substantially the same as the common electrode 62 and the sealant 95 shown in FIG. 1, except that they do not overlap each other when viewed in the viewing direction, and repeated explanations thereof will be omitted.

When a common electrode is disposed under a sealant in a TN mode, a delamination failure may be liable to occur. Accordingly, in the display device according to still another embodiment of the present invention, the common electrode disposed under the sealant can be removed even in the TN mode, like the VA mode, thereby solving the problem of delaminating failure.

Figure 4:
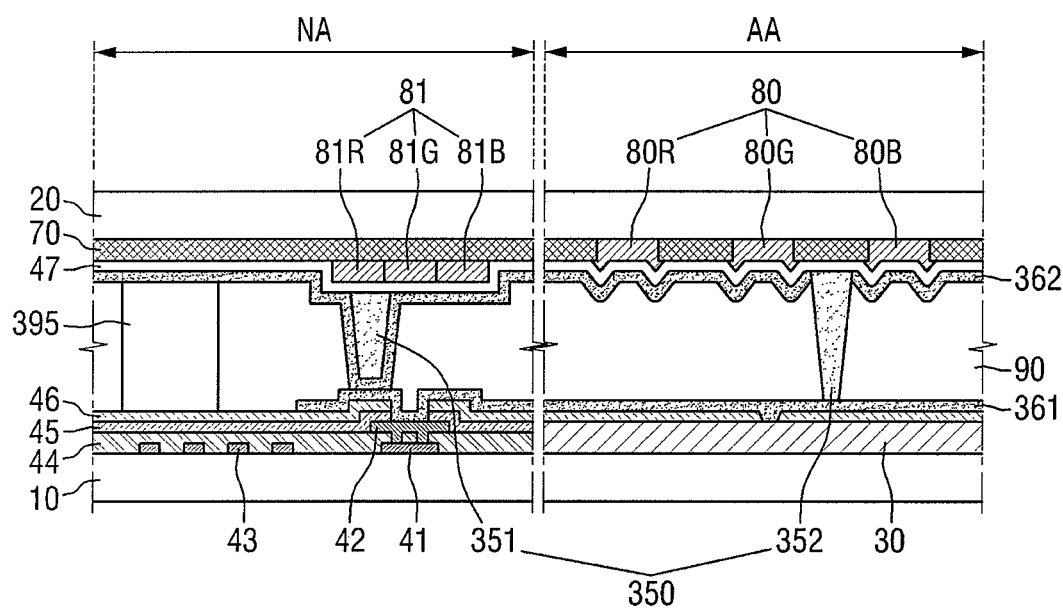

FIG. 4 is a cross-sectional view of a display device according to still anther embodiment of the present invention. Referring to FIG. 4, the display device 300 is a TN mode liquid crystal display device having an improved delaminating property and includes a first substrate 10, a second substrate 20, a common voltage line 41, a plurality of column spacers 350, a conductive layer 361, a common electrode 362 and a liquid crystal layer 90. FIG. 3 shows only a partial section of the display device 300. For the sake of convenient explanation, in FIG. 4, substantially the same elements as those of the display device shown in FIG. 1 are denoted by the same reference numerals and repeated explanations will be omitted.

The conductive layer 361 is formed on the first substrate 10. The conductive layer 361 may be formed of a transparent conductive material, for example, indium tin oxide (ITO), indium zinc oxide (IZO) or the like. The conductive layer 361 may be formed in the display area AA of the first substrate 10 and may function as a pixel electrode. Therefore, the conductive layer 361 formed in the display area AA of the first substrate 10 may be electrically connected to a drain electrode of a thin film transistor 30 through an opening of an organic film 46. In addition, the conductive layer 361 may be formed in the non-display area NA of the first substrate 10. The conductive layer 361 formed in the non-display area NA of the first substrate 10 may be electrically connected to the common voltage line 41 through the passivation film and the opening of the organic film 46. Specifically, the conductive layer 361 formed in the non-display area NA of the first substrate 10 may be electrically connected to the common voltage line 41 through the intermediate conductor 42. The conductive layer 361 electrically connected to the common voltage line 41 may apply a common voltage to the common electrode 362 formed on the second substrate 20, which will later be described.

A plurality of column spacers 350 may be formed on the first substrate 10 to maintain a cell gap between the first substrate 10 and the second substrate 20. The plurality of column spacers 350 may include a first column spacer 351 formed in the non-display area NA of the second substrate 20 and a second column spacer 352 formed in the display area AA. The first column spacer 351 may be formed on the coating layer 47 in the non-display area NA, and the second column spacer 52 may be formed on the coating layer 47 in the display area AA. In embodiments, the column spacer 351 may extend from a structure formed over the second substrate such that a layer, for example, the common electrode 362, formed over the column spacer 351 can contact a layer, for example, the conductive layer 361, formed over the first substrate.

The first column spacer 351 formed in the non-display area NA may be disposed to be closer to the display area AA than a sealant 395 formed in the non-display area NA. For brevity, FIG. 4 illustrates one of the first column spacer 351 and one of the second column spacer 352, but aspects of the present invention are not limited thereto. Various numbers of the first and second column spacers may be provided, respectively.

The common electrode 362 may be formed on the second substrate 20. The common electrode 362 may be formed on both of the display area AA and the non-display area NA of the second substrate 20. Alternatively, the common electrode 362 may be formed on the black matrix 70, the color filter 80 and the dummy color filter 81. In addition, the common electrode 362 may also be formed on the coating layer 47 to cover the first column spacer 351 formed in the non-display area NA. The common electrode 362 may be formed along the surface of the first column spacer 351 and in conformity with the surface of the first column spacer 351.

The common electrode 362 formed on the second substrate 20 and the conductive layer 361 formed on the first substrate 10 are electrically connected to each other. Therefore, a common voltage applied to the common voltage line 41 may be applied to the common electrode 362. Specifically, the common voltage applied to the common voltage line 41 may also be applied to the common electrode 362 through the intermediate conductor 42 and the conductive layer 361.

In the display device according to still another embodiment of the present invention, a short-circuit point for short-circuiting a common voltage line and a common electrode is not necessary. That is to say, in order to electrically connect a common voltage line formed on a thin film transistor substrate and a common electrode formed on a color filter substrate to each other, a separate short-circuit point has conventionally been formed in a non-display area. Thus, a width of the non-display area has increased and a width of a black matrix has increased accordingly. However, in the display device according to still another embodiment of the present invention, a column spacer may function as a short-circuit point without manufacturing a short-circuit point, thereby implementing a simplified process. In addition, in the display device according to still another embodiment of the present invention, it is not necessary to secure a separate area for forming a short-circuit point on a non-display area, and a slim black matrix having a reduced width can be employed.

Figure 5:
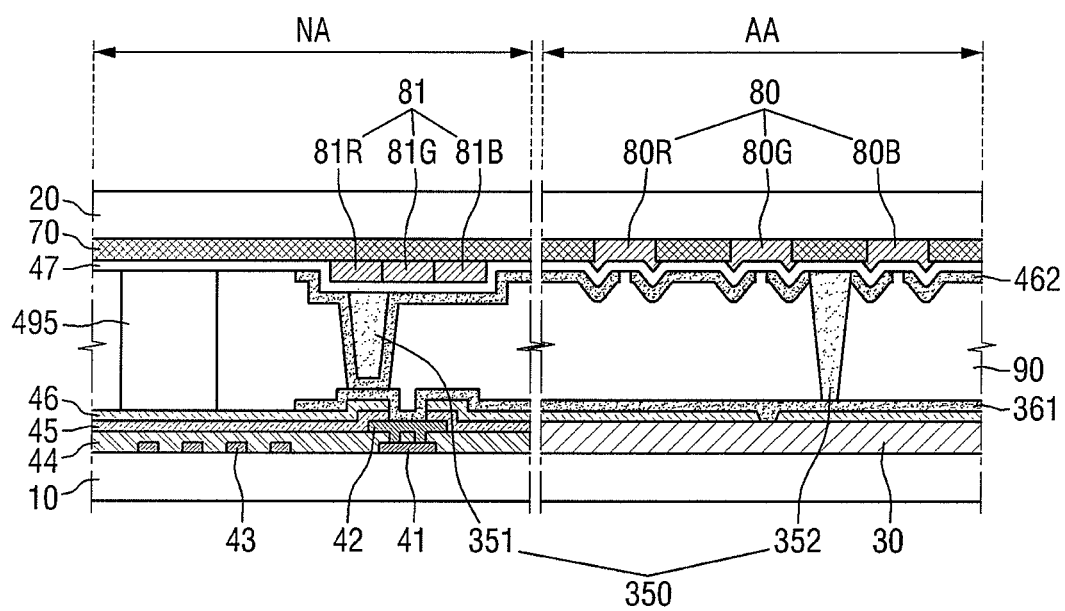

FIG. 5 is a cross-sectional view of a display device according to another embodiment of the present invention. Referring to FIG. 5, the display device 500 is a VA mode liquid crystal display device and includes a first substrate 10, a second substrate 20, a common voltage line 41, a plurality of column spacers 350, a conductive layer 361, a common electrode 462 and a liquid crystal layer 90. FIG. 5 shows only a partial section of the display device 500. For the sake of convenient explanation, in FIG. 5, substantially the same elements as those of the display device shown in FIG. 4 are denoted by the same reference numerals and repeated explanations will be omitted.

The common electrode 462 may be formed on the second substrate 20. The common electrode 462 may be formed on both of the display area AA and the non-display area NA of the second substrate 20. Alternatively, the common electrode 462 may be formed on the black matrix 70, the color filter 80, the dummy color filter 81 and the plurality of column spacers 350. In addition, the common electrode 462 may also be formed on the coating layer 47. The common electrode 462 may include a cutout portion that opens or exposes a portion of the color filter 80 and does not overlap a sealant 495 when viewed in the viewing direction. The common electrode 462 and the sealant 495 are substantially the same as the common electrode 362 and the sealant 395 shown in FIG. 4, except that the common electrode 462 includes the cutout portions and does not overlap the sealant 495 when viewed in the viewing direction, and repeated explanations thereof will be omitted.

Figure 6:
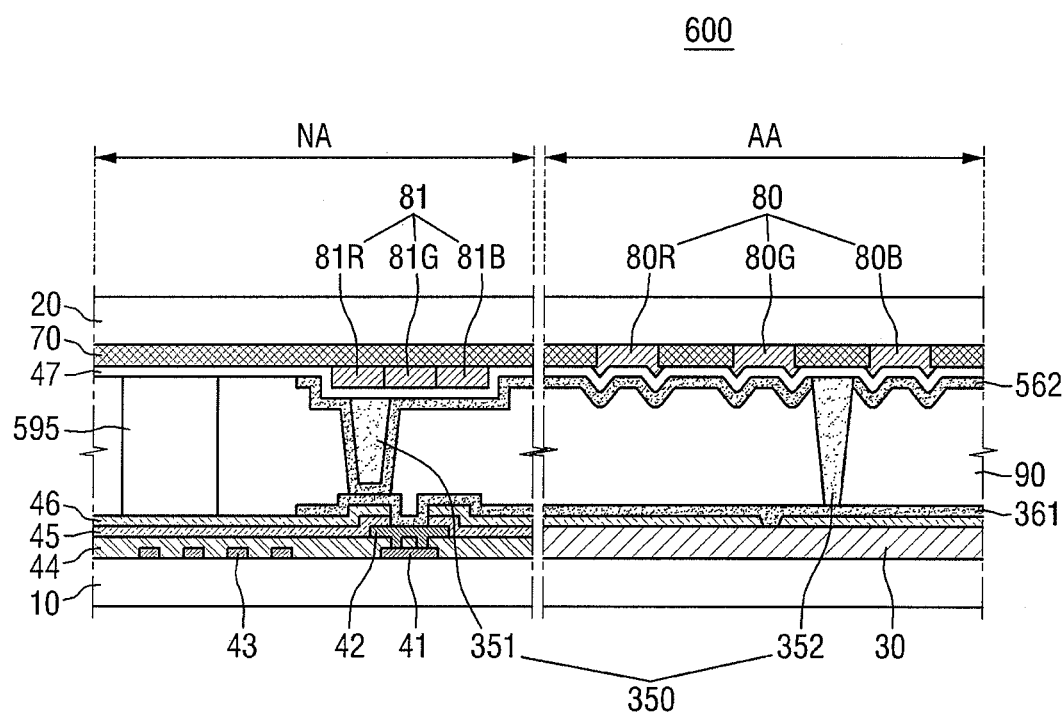

FIG. 6 is a cross-sectional view of a display device according to still another embodiment of the present invention. Referring to FIG. 6, the display device 600 is a TN mode liquid crystal display device having an improved delaminating property and includes a first substrate 10, a second substrate 20, a common voltage line 41, a plurality of column spacers 350, a conductive layer 361, a common electrode 562 and a liquid crystal layer 90. FIG. 3 shows only a partial section of the display device 600. For the sake of convenient explanation, in FIG. 6, substantially the same elements as those of the display device shown in FIG. 4 are denoted by the same reference numerals and repeated explanations will be omitted.

The common electrode 562 may be formed on the second substrate 20. The common electrode 562 may be formed on both of the display area AA and the non-display area NA of the second substrate 20. Alternatively, the common electrode 562 may be formed on the black matrix 70, the color filter 80, the dummy color filter 81 and the plurality of column spacers 350. In addition, the common electrode 562 may also be formed on the coating layer 47. In embodiments, the common electrode 562 and a sealant 595 do not overlap each other when viewed in the viewing direction. The common electrode 562 and the sealant 595 are substantially the same as the common electrode 362 and the sealant 395 shown in FIG. 4, except that they do not overlap each other when viewed in the viewing direction, and repeated explanations thereof will be omitted.

When a common electrode is disposed under a sealant in a TN mode, a delamination failure may be liable to occur. Accordingly, in the display device according to still another embodiment of the present invention, the common electrode disposed under the sealant can be removed even in the TN mode, like the VA mode, thereby solving the problem of delaminating failure.

Figure 7:
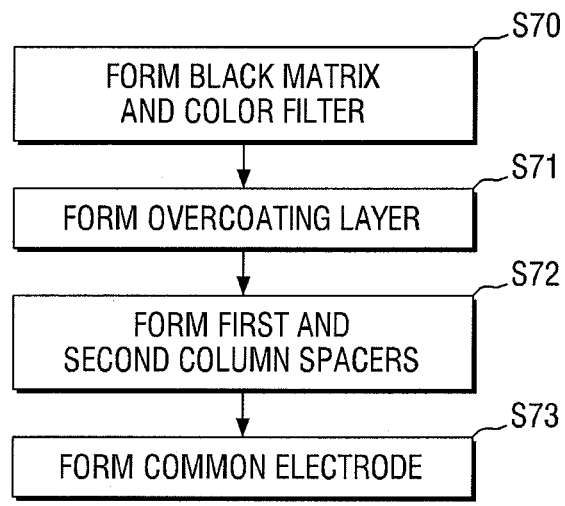
FIG. 7 is a flowchart of a method of manufacturing a display device according to an embodiment of the present invention.
Figure 8:
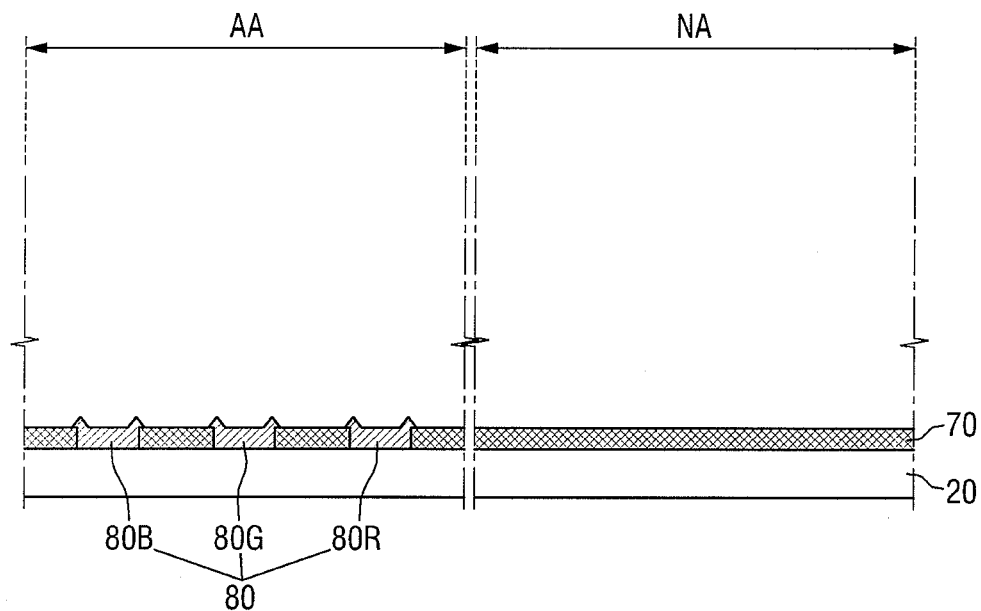
FIGS. 8 to 12 are cross-sectional views illustrating various process steps for explaining the method of manufacturing a display device shown in FIG. 7.
Figure 9:
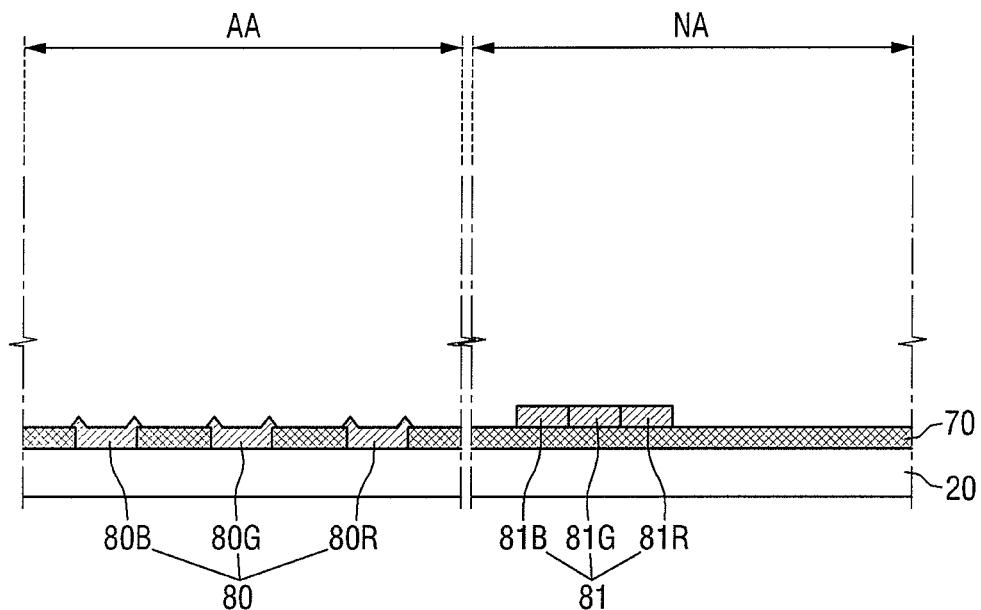
Figure 10:
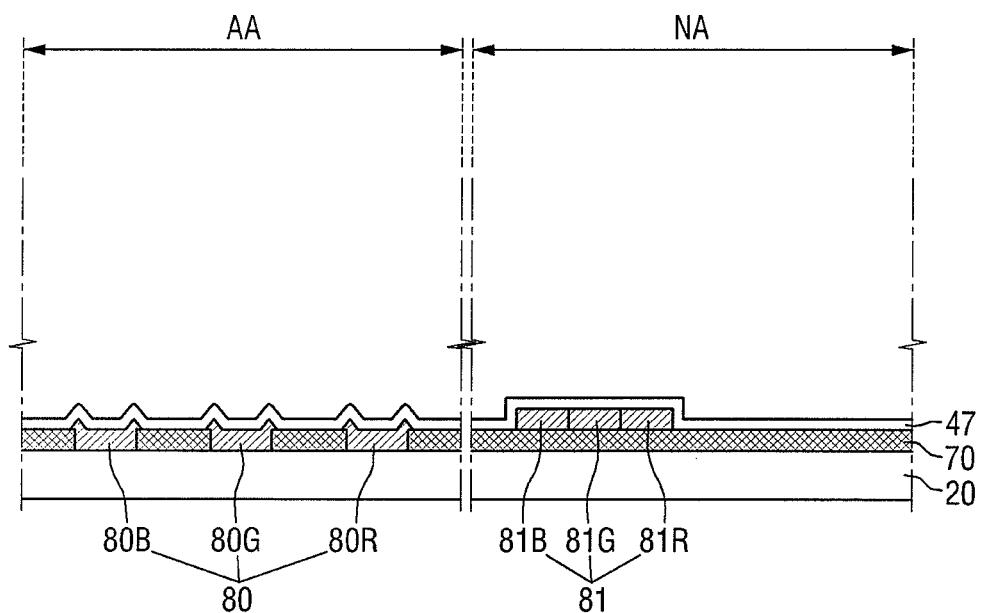
Figure 11:
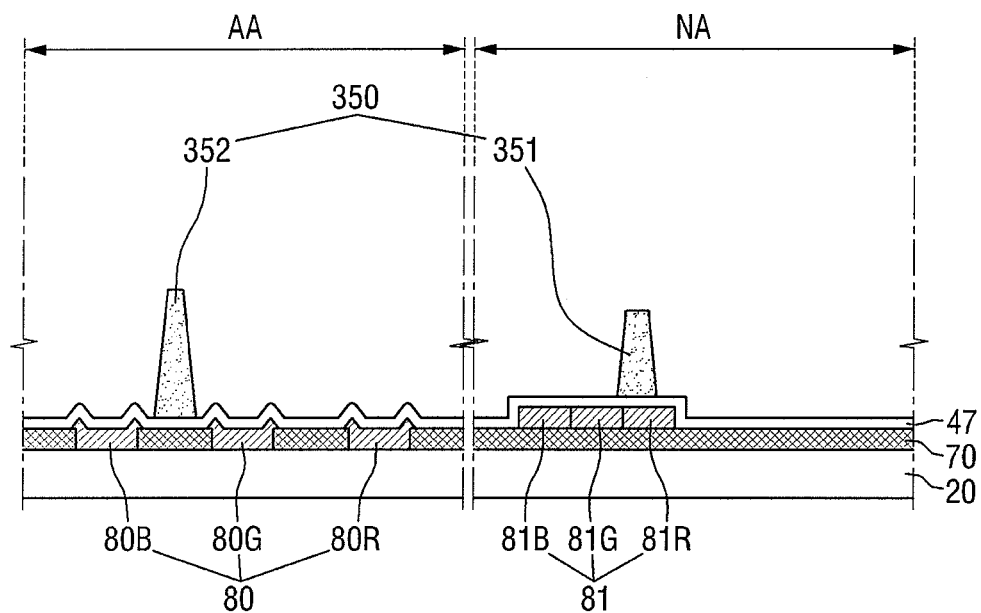
Figure 12:
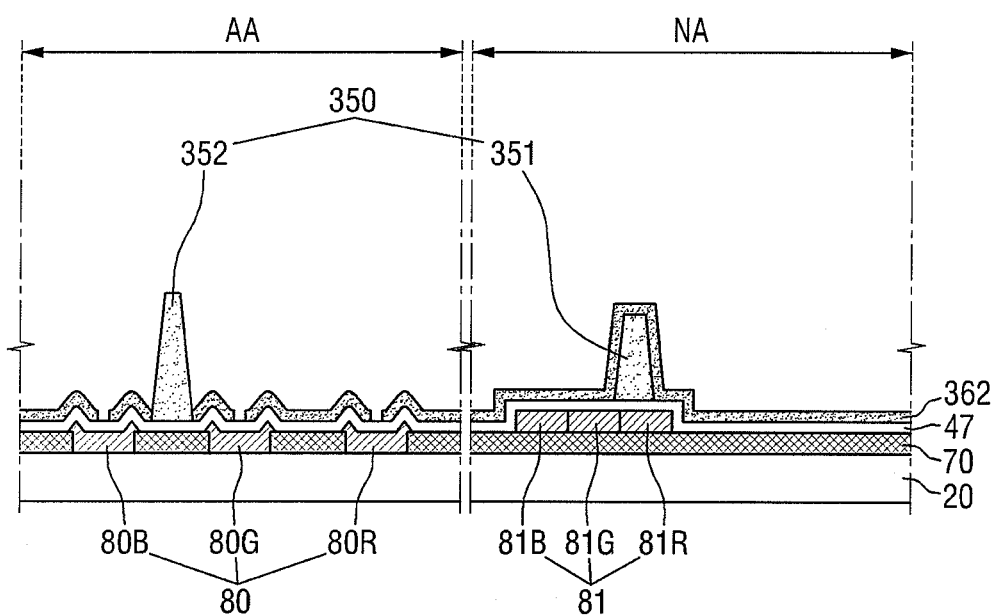

FIG. 7 is a flowchart of a method of manufacturing a display device according to an embodiment of the present invention, and FIGS. 8 to 12 are cross-sectional views illustrating various process steps for explaining the method of manufacturing a display device shown in FIG. 7.

First, a black matrix 70 and a color filter 80 are formed on a substrate 20 (S70). The forming of the black matrix 70 and the color filter 80 on the substrate 20 is substantially the same as the forming of the black matrix and the color filter on the substrate shown in FIGS. 1 to 6, and repeated explanations thereof will be omitted.

The forming of the color filter 80 may include forming a dummy color filter 81 on the black matrix 70 formed in the non-display area NA. The forming of the dummy color filter 81 is substantially the same as the forming of the dummy color filter shown in FIGS. 1 to 6, and repeated explanations thereof will be omitted.

Next, a coating layer 47 is formed on the black matrix 70 and the color filter 80 (S71). The forming of the coating layer 47 is substantially the same as the forming of the coating layer shown in FIGS. 1 to 6, and repeated explanations thereof will be omitted.

Next, a first column spacer 351 and a second column spacer 352 are formed on the coating layer 47 (S72). The forming of the first column spacer 351 and the second column spacer 352 is substantially the same as the forming of the first column spacer and the second column spacer shown in FIGS. 4 to 6, and repeated explanations thereof will be omitted.

Next, a common electrode 462 is formed on the coating layer 47 and the first column spacer 351 (S73). The forming of the common electrode 462 is substantially the same as the forming of the common electrode shown in FIG. 5, and repeated explanations thereof will be omitted.

While embodiments of the present invention have been particularly shown and described, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:
1. A display device comprising:
a first substrate and a second substrate opposing each other, one of the first and second substrates comprising a display surface;
a display area and a non-display area surrounding the display area when viewed in a direction perpendicular to the display surface;
a common voltage line formed over the first substrate in the non-display area when viewed in the direction;
an organic material layer formed over the first substrate in both the display area and the non-display area when viewed in the direction;
at least one column spacer formed over the organic material layer in the non-display area, the at least one column spacer comprising a bottom facing the first substrate and a top facing the second substrate, wherein the at least one column spacer is made of a first material and comprises a bottom, wherein the bottom of the at least one column spacer contacts the organic material layer;
a common electrode formed under the second substrate;
a conductive layer formed over the organic material layer and electrically connected to the common voltage line through an opening formed through the organic material layer, wherein the conductive layer extends over the at least one column spacer to electrically contact the common electrode at the top of the at least one column spacer;
a liquid crystal layer interposed between the first substrate and the second substrate; and
a sealing member formed between the first substrate and the second substrate.
2. The display device of claim 1, further comprising at least one thin film transistor formed over the first substrate, wherein the thin film transistor includes a gate electrode, a source electrode, a drain electrode and a semiconductor layer.

3. The display device of claim 2, further comprising an intermediate conductor formed over the common voltage line and electrically connected to the common voltage line, wherein the conductive layer is electrically connected to the common voltage line through the intermediate conductor.

4. The display device of claim 3, wherein the intermediate conductor is formed of the same material as the source electrode and the drain electrode.

5. The display device of claim 2, further comprising a pixel electrode electrically connected to the drain electrode, wherein the conductive layer is formed of the same material as the pixel electrode.

6. The display device of claim 1, wherein the at least one column spacer is located inwardly from the sealing member, wherein both of the conductive layer covering the at least one column spacer and the common electrode electrically connected to the conductive layer do not extend over the sealing member when viewed in the direction.

7. The display device of claim 1, further comprising a color filter and a black matrix formed over the second substrate, wherein the common electrode is formed over the color filter and the black matrix.

8. The display device of claim 7, further comprising a dummy color filter formed over the black matrix disposed in the non-display area, and disposed between the common electrode and the black matrix.

9. The display device of claim 7, wherein the common electrode includes a cutout portion that exposes a portion of the color filter.

* * * * *